US008421960B2

(12) United States Patent
Lee et al.

(10) Patent No.: US 8,421,960 B2
(45) Date of Patent: Apr. 16, 2013

(54) LIQUID CRYSTAL DISPLAY HAVING IN-CELL BACKLIGHT

(75) Inventors: Sang Yeup Lee, Uiwang-si (KR); Hyung Seok Jang, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 561 days.

(21) Appl. No.: 11/637,447

(22) Filed: Dec. 11, 2006

(65) Prior Publication Data
US 2007/0146581 A1    Jun. 28, 2007

(30) Foreign Application Priority Data

Dec. 27, 2005   (KR) .................. 10-2005-0130975

(51) Int. Cl.
*G02F 1/1335* (2006.01)

(52) U.S. Cl.
USPC .............................................. 349/69; 349/70

(58) Field of Classification Search .............. 349/61–71; 313/483–512
See application file for complete search history.

(56) References Cited

U.S. PATENT DOCUMENTS

| | | | |
|---|---|---|---|
| 5,760,858 A * | 6/1998 | Hodson et al. | 349/61 |
| 7,006,171 B1 * | 2/2006 | Koden et al. | 349/61 |
| 2002/0039161 A1 * | 4/2002 | Kim | 349/129 |
| 2002/0105606 A1 * | 8/2002 | Sakaigawa | 349/61 |
| 2003/0142246 A1 * | 7/2003 | Kato | 349/65 |

FOREIGN PATENT DOCUMENTS

| | | | |
|---|---|---|---|
| JP | 11249135 A | | 9/1999 |
| JP | 2000347633 A | * | 12/2000 |
| KR | 20030093472 A | | 12/2003 |

OTHER PUBLICATIONS

Office Action issued in corresponding Korean Patent Application No. 10-2005-0130975, mailed Jun. 27, 2012.

* cited by examiner

*Primary Examiner* — Jessica M Merlin
(74) *Attorney, Agent, or Firm* — Brinks Hofer Gilson & Lione (57) ABSTRACT

A liquid crystal display having an in-cell backlight and method of manufacturing the same is provided. The liquid crystal display includes a front substrate and a rear substrate opposite to each other. A color filter layer comprises a black matrix, a color filter and a common electrode on the front substrate. An array element comprises a plurality of gate lines and data lines having to cross each other, and a pixel electrode with the common electrode to generate electric field on the rear substrate. A liquid crystal layer is disposed between the color filter layer and the array element. A light source layer is disposed between the rear substrate and the array element and configured to supply light to the front substrate. At least one polarization plate is laminated on the light source layer.

3 Claims, 10 Drawing Sheets

LIQUID CRYSTAL DISPLAY HAVING IN-CELL BACKLIGHT

This patent document claims priority to Korean Patent Application No. 10-2005-0130975 filed on Dec. 27, 2005, the entire contents of which are hereby incorporated by reference.

BACKGROUND

1. Field

The present embodiments relate to a liquid crystal display having an in-cell backlight, and a method of manufacturing liquid crystal display having an in-cell backlight.

2. Related Art

Recently, the role of electronic display devices has become more important. A variety of electronic display devices have been widely used in various industry fields.

Generally, a LCD includes two substrates respectively having an electric-field generating electrode formed therein. The two substrates are disposed opposite to each other. A liquid crystal layer is formed between the two substrates. Liquid crystal molecules of the liquid crystal layer are moved by an electric field that is generated by applying voltage to the two electrodes, thus varying the transmittance of light. The LCD is adapted to display an image by controlling the transmittance of light.

The LCD device has been used in a variety of application fields because of characteristics, such as lightweight, a thin profile, and low-power consumption driving. The LCD device has been widely used in the fields of display devices, such as an instrument board indicating the progress direction, altitude, etc. of an aircraft, display devices of navigation for military use and vehicles, which requires high reliability at high altitudes. In addition, LCD devices have been used as office automated devices, such as personal computers, notebook computers and copy machines, portable devices, such as mobile phones and pagers, and so on.

The conventional LCD will be described below.

Figure 1:
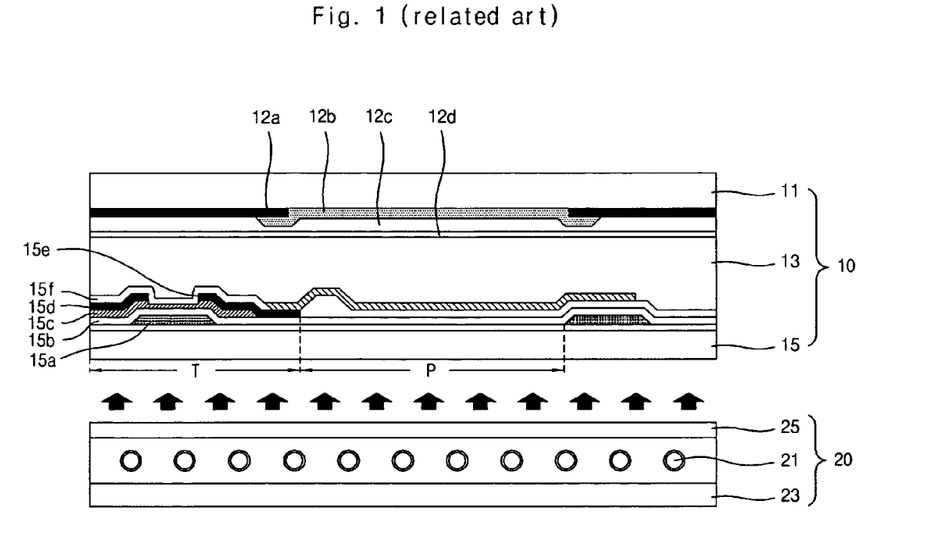
FIG. 1 is a cross-sectional view showing a general structure of a LCD according to the related art.

FIG. 1 is a cross-sectional view showing a general structure of a LCD. In FIG. 1, a Twisted Nematic (TN) mode employing a Thin Film Transistor (TFT), of the types of the LCD, is illustrated as an example.

The cross-sectional LCD comprises a liquid crystal panel 10 on which an image is displayed. A backlight unit 20 is disposed at the rear of the liquid crystal panel 10 and configured to provide a light source toward the liquid crystal panel 10. An external casing (not shown) contains the liquid crystal panel 10 and the backlight unit 20.

The liquid crystal panel 10 comprises a front substrate 11 and a rear substrate 15 opposite to each other, and a liquid crystal layer 13 formed therebetween. A black matrix 12a, a color filter layer 12b, an over-coat layer 12c and a common electrode 12d are formed under the front substrate 11.

The color filter layer 12b is partially overlapped with the black matrix 12a, so that red (R), green (G) and blue (B) are repeatedly constructed in a pixel region P.

In the rear substrate 15, a TFT (T) is formed, which comprises a gate electrode 15a, a gate insulating layer 15b, a semiconductor layer 15c, source and drain electrodes 15d, 15e, and a protection layer 15f in matrix form. The TFT (T) is connected to a pixel electrode that forms the pixel region P.

The liquid crystal layer 13 is provided with a spacer (not shown) for constantly maintaining a cell gap between the front substrate 11 and the rear substrate 15. A seal pattern (not shown) for maintaining the cell gap and preventing the leakage of the liquid crystal layer 13 is provided on the outer line of the liquid crystal layer 13.

Though not illustrated in the drawing, upper and lower alignment films are respectively formed on inner surfaces brought in contact with the liquid crystal layer 13 of the front substrate 11 and the rear substrate 15.

The backlight unit 20, as illustrated in FIG. 1, is disposed at the rear of the liquid crystal panel 10, and functions to provide light toward the liquid crystal panel 10. Backlight units 20 are classified into a direct type or an edge type backlight unit depending on the installation structure (location) of a light source that emits light.

A direct type backlight unit includes a light source disposed at the front of the panel. The edge type backlight unit includes a light source disposed laterally to the panel.

The direct type backlight unit will be described in detail. As illustrated in FIG. 1, the direct type backlight unit includes a plurality of lamps 21 arranged in a row immediately below the rear of the liquid crystal panel 10. A reflection plate 23 is disposed under the plurality of lamps 21. An optical film 25 is disposed over the lamps 21 and configured to polarize light emitted from the lamps 21. Accordingly, the light emitted from the lamps 21 can be provided to the front of the liquid crystal panel 10.

An edge type backlight unit includes an additional waveguide provided at the rear of the liquid crystal panel 10, and lamps are installed laterally to the waveguide. Thus, light incident from the side of the waveguide can be refracted and provided to the front of the liquid crystal panel 10.

The conventional LCD constructed above is completed through a process of manufacturing the liquid crystal panel 10, a process of manufacturing the backlight unit 20, and a process of assembling the liquid crystal panel 10 and the backlight unit 20.

For example, the backlight unit 20 is manufactured as an external module that is separate from the process of manufacturing the liquid crystal panel 10, and is subsequently assembled with the liquid crystal panel 10, thus completing the LCD.

The conventional LCD is problematic in that it requires a relatively long process time in the manufacture process and is complicated in the process procedure. The conventional LCD is problematic in that it is difficult to achieve an ultra-thin because the backlight unit 20 is mounted at the rear of the liquid crystal panel 10.

SUMMARY

The present embodiments may obviate one or more of the limitations or disadvantages of the related art. For example, in one embodiment, a liquid crystal display device having an in-cell backlight can reduce the manufacturing cost and a process time of the device. In another embodiment, a liquid crystal display device having an in-cell backlight can be externally compact (ultra-thin) by inserting a backlight unit that provides a light source to a liquid crystal panel into a cell.

In one embodiment, a Liquid Crystal Display having an in-cell backlight includes a front substrate and a rear substrate opposite to each other. A color filter layer includes a black matrix, a color filter and a common electrode on the front substrate. An array element includes a plurality of gate lines and data lines having to cross each other, and a pixel electrode with the common electrode to generate electric field on the rear substrate. A thin film transistor and the pixel electrode are formed at crossing points of the gate lines and the data lines. A liquid crystal layer is formed between the color filter layer and the array element. A light source layer is inserted between the rear substrate and the array element and configured to supply light to the front substrate. At least one polarization plate is laminated on the light source layer.

A method of manufacturing a Liquid Crystal Display having an in-cell backlight includes providing a front substrate and a rear substrate opposite to each other, forming a color filter layer having a black matrix, a color filter and a common electrode on the front substrate, forming a light source layer on the rear substrate, forming at least one polarization plate on the light source layer, forming an array element comprising a thin film transistor being a switching element and a pixel electrode on the polarization plate, coalescing the front substrate and the rear substrate, and forming a liquid crystal layer between the front substrate and the rear substrate.

DETAILED DESCRIPTION

A Liquid Crystal Display (LCD) and a method of manufacturing the same according to the present invention will be described below in connection with specific embodiments. However, the present embodiments are not limited to the recited specific embodiments. For example, the first embodiment may include various alternative embodiments and may be combined with any of the other embodiments. The recited features are intended to include all equivalent and similar features, and are not intended to limit the scope of the claimed subject matter.

First Embodiment

Figure 2:
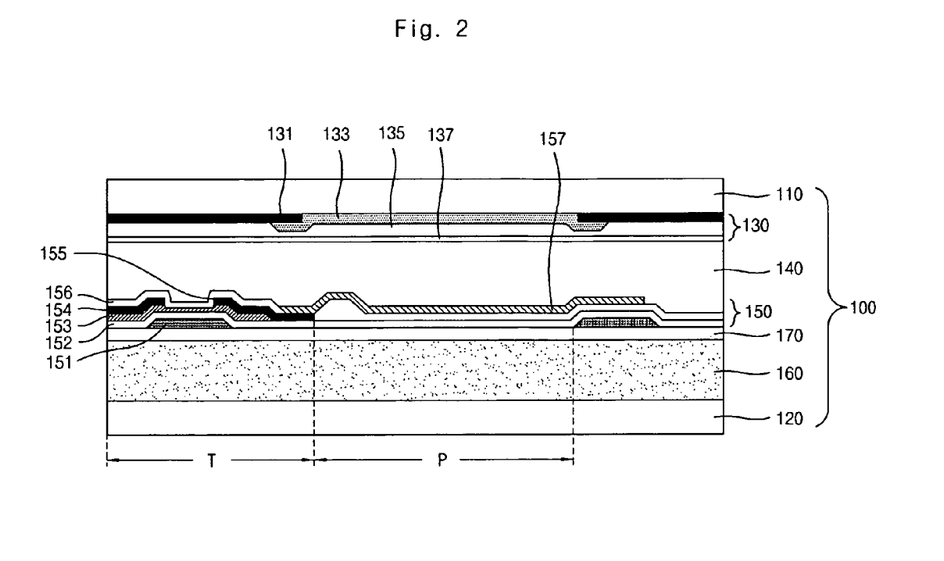
FIG. 2 is a cross-sectional view showing one embodiment of a LCD having an in-cell backlight.

In the first embodiment, as shown in FIG. 2, the LCD includes a front substrate 110 and a rear substrate 120 opposite to each other. A color filter layer 130 is disposed below the front substrate 110. An array element 150 is formed over the rear substrate 120. A liquid crystal layer 140 is formed between the color filter layer 130 and the array element 150. A light source layer 160 intervenes between the rear substrate 120 and the array element 150 and is configured to provide light toward the front substrate 110. At least one polarization plate 170 is laminated on the light source layer 160.

According to a first embodiment, the light source layer 160 generates light within a cell of a liquid crystal panel 100. This embodiment is unlike an existing LCD structure.

The term "cell" refers to a liquid crystal panel comprising the front substrate 110, the rear substrate 120 and the liquid crystal layer 140.

The color filter layer 130 includes a black matrix 131, a color filter 133 and an over-coat layer 135 under the front substrate 110. In the case of the TN mode, a common electrode 137 may be disposed below the over-coat layer 135.

The color filter 133 is partially overlapped with the black matrix 131, so that the R, G and B colors are repeatedly arranged in a pixel region P.

The array element 150 is disposed to cross a plurality of gate lines and data lines. A TFT and a pixel electrode 157 are formed at a crossing point of the array element 150 and the gate lines and data lines.

In one embodiment, as shown in FIG. 2, the TFT (T), includes a gate electrode 151, a gate insulating layer 152, a semiconductor layer 153, source and drain electrodes 154 and 155, and a protection layer 156. The pixel electrode 157 is connected to the TFT (T) and is formed on the pixel region (P).

The liquid crystal layer 140 is provided with a spacer (not shown) that constantly maintains a cell gap between the front substrate 110 and the rear substrate 120. A seal pattern (not shown) that maintains the cell gap and prevents the leakage of the liquid crystal layer 140 is provided on the outer line of the liquid crystal layer 140.

Though not illustrated in the drawing, upper and lower alignment films are respectively formed on inner surfaces brought in contact with the liquid crystal layer 140 of the front substrate 110 and the rear substrate 120.

The light source layer 160 is located between the rear substrate 120 and the array element 150, as illustrated in FIG. 2, and supplies light to the liquid crystal panel.

Figure 3:
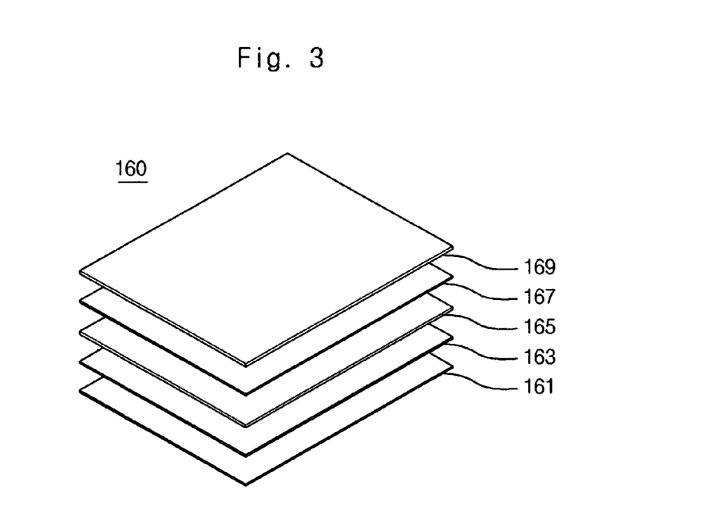
FIG. 3 is a perspective view of one embodiment of a light source layer in the LCD.

In one embodiment, the light source layer 160, as illustrated in FIG. 3, includes a lower electrode 161, an upper electrode 167, a field-emission phosphor layer 165 formed between the lower electrode 161 and the upper electrode 167, a lower dielectric layer 163 formed on the lower electrode 161, and an upper dielectric layer 169 formed on the upper electrode 167.

In one embodiment, the upper electrode 167 and the lower electrode 161 apply an electric field to the field-emission phosphor layer 165. The field-emission phosphor layer 165 causes electrons, emitted by the electric field applied between the upper electrode 167 and the lower electrode 161, to be transferred within the field-emission phosphor layer 165 and thus to emit light.

The upper electrode 167 and the lower electrode 161 may be formed from a transparent conductive material having transmittance and may be provided as one sheet form. In this embodiment, the upper electrode 167 and the lower electrode 161 have a size corresponding to the whole area of the light source layer 160.

In one embodiment, the lower dielectric layer 163 serves to assist a smooth movement of electrons generated from the lower electrode 161 when the electrons move to the field-emission phosphor layer 165.

The field-emission phosphor layer 165 may be formed using inorganic white pigments.

The upper dielectric layer 169 is a low dielectric layer, and decreases the load by prohibiting parasitic capacitance between the upper electrode 167 and the gate lines of the array element 150.

The light source layer 160 constructed above makes different the polarity of voltage, applied to the upper electrode 167 and the lower electrode 161, depending on the progress direction of light emitted therefrom. For example, in the case where light emitted from the light source layer 160 is oriented from the lower side to the upper side, the upper electrode 167 has a positive polarity, and the lower electrode 161 has a negative polarity. In this example, the lower electrode 161 may be formed of a metal material having a work function relatively lower than that of the upper electrode 167.

The emission principle of the light source layer 160 constructed above will be described below with reference to FIG. 4.

Figure 4:
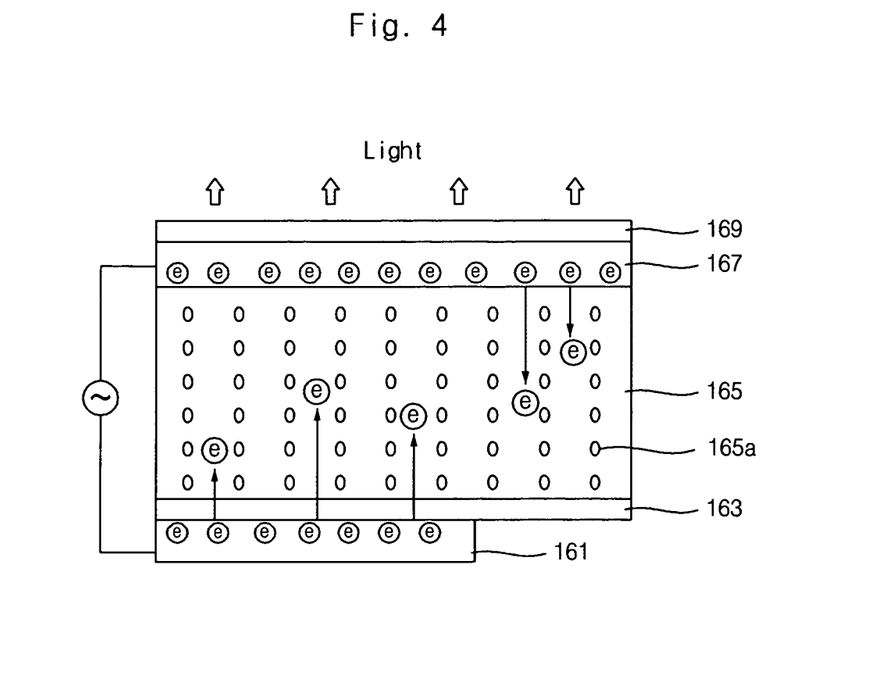
FIG. 4 is a conceptual view illustrating the emission principle of the light source layer illustrated in FIG. 3.

In one embodiment, as shown in FIG. 4, electrons (e) generated by an electric field between the upper electrode 167 and the lower electrode 161 move to the field-emission phosphor layer 165, if the upper electrode 167 and the lower electrode 161 are applied with AC voltage. The electrons (e), accelerated by a high electric field, emit light while colliding against an light-emitting material 165a within the field-emission phosphor layer 165.

Figure 5:
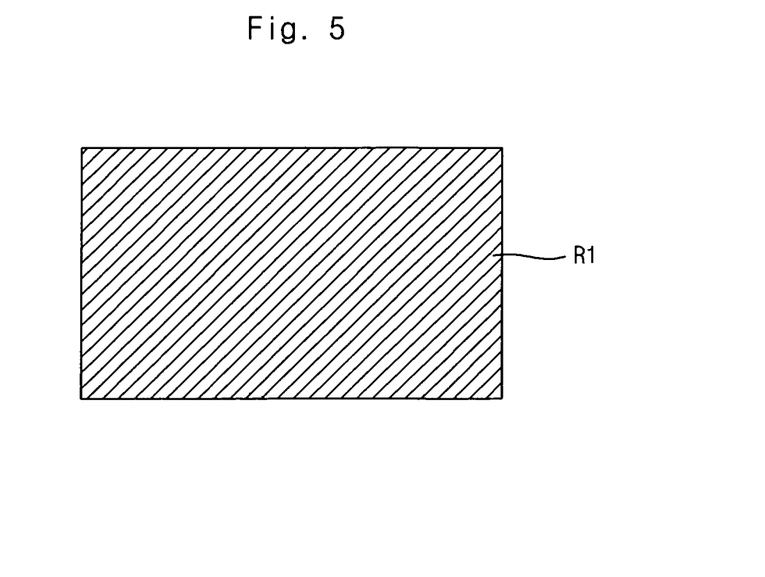
FIG. 5 is a view illustrating the region of light, which is emitted through the light source layer in a LCD device.

As illustrated in FIG. 5, a region R1 of light emitted from the light source layer 160 corresponds to the area of the upper electrode 167 from which light is emitted from the light source layer 160. For example, the region R1 has the same area as that of the upper electrode 167 provided in one surface fashion.

The polarization plate 170 polarizes light emitted from the light source layer 160 and provides the polarized light to the front substrate 110. The polarization plate 170 is formed on the upper dielectric layer 169 of the light source layer 160 by a laminating method.

In one embodiment, the LCD having the in-cell backlight includes the light source layer 160 and the polarization plate 170 that supplies light to the cell of the liquid crystal panel 100 having the front substrate 110, the rear substrate 120 and the liquid crystal layer 140. In this embodiment, light emitted from the light source layer 160 can be polarized by the polarization plate 170 and is then provided to the upper side of the liquid crystal panel 100.

The light is emitted from the light source layer 160 as the electrons generated by the electric field between the upper electrode 167 and the lower electrode 161 in the light source layer 160 collide against the light-emitting material in the field-emission phosphor layer 165.

In the first embodiment, the LCD of the TN mode employing the TFT has been described as an example. However, the present invention is not limited thereto, but may be applied to a variety of LCDs having a Vertically Aligned (VA) mode, an In-Plane Switching (IPS) mode, an Optically Compensated Birefrigence (OCB) mode, and the like.

Second Embodiment

Figure 6:
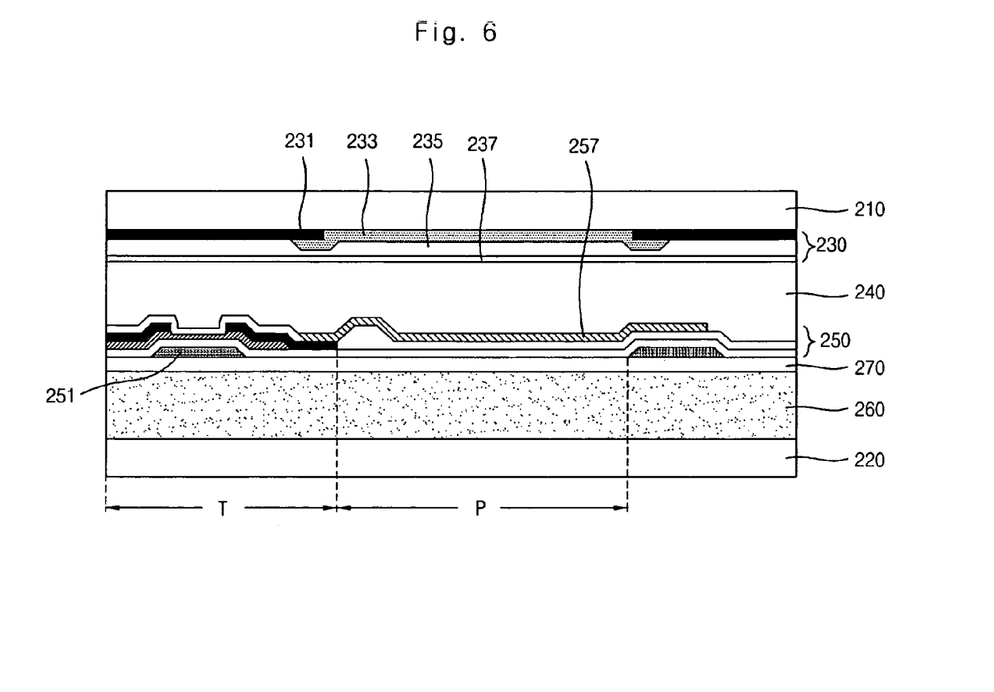
FIG. 6 is a cross-sectional view showing one embodiment of a LCD having an in-cell backlight.

In one embodiment, as shown in FIG. 6, the LCD according to a first embodiment includes a front substrate 210 and a rear substrate 220 opposite to each other. A color filter layer 230 is disposed below the front substrate 210. An array element 250 is formed over the rear substrate 220. A liquid crystal layer 240 is formed between the color filter layer 230 and the array element 250. A light source layer 260 intervenes between the rear substrate 220 and the array element 250 and is configured to provide light toward the front substrate 210, and at least one polarization plate 270 laminated on the light source layer 260.

In one embodiment, as shown in FIG. 6, reference numeral 231 indicates a black matrix, 233 indicates a color filter, 235 indicates an over-coat layer, and 237 indicates a common electrode.

The LCD according to a second embodiment has the same constituent elements as those of the first embodiment except for the structure of the light source layer 260. Accordingly, the LCD according to the second embodiment has a structure in which parasitic capacitance with the lines of the array element 250 can be removed, and light luminance can be partially controlled, if appropriate.

Figure 7:
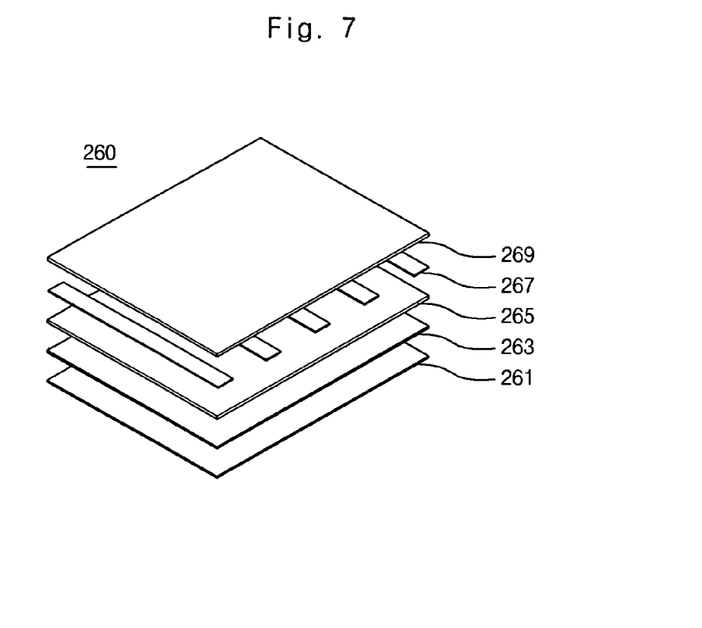
FIG. 7 is a perspective view of one embodiment of a light source layer in the LCD.

In one embodiment, as shown in FIG. 7, the light source layer 260 includes a lower electrode 261 and an upper electrode 267. A field-emission phosphor layer 265 is formed between the lower electrode 261 and the upper electrode 267 and is formed of inorganic white pigments. A lower dielectric layer 263 is formed on the lower electrode 261. An upper dielectric layer 269 is formed on the upper electrode 267.

In one embodiment, the upper electrode 267 is arranged in plural in one direction. The lower electrode 261 has a size that corresponds to the whole area of the light source layer 260 as one surface fashion.

The upper electrodes 267 may be formed by arranging a plurality of electrodes having the same size according to a specific pattern in one direction, or may be formed by patterning a plurality of electrodes having the same size at regular intervals.

The upper electrodes 267 may be arranged longitudinally or laterally along the plurality gate lines and data lines In other words, the upper electrodes 267 are arranged not to overlap with the lines of the array element 250.

Figure 8:
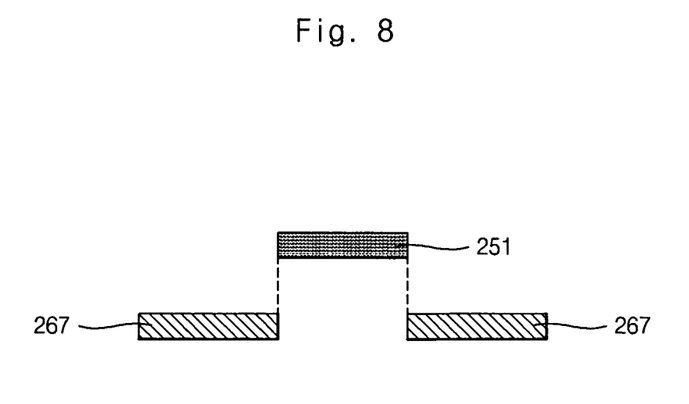
FIG. 8 is a conceptual view illustrating an arrangement relationship between the light source layer and a gate electrode in the LCD.

For example, in the case where the upper electrodes 267 are arranged laterally, they are arranged to cross each other without being overlapped with the gate electrode 251, which is the closest to the array element 250, as illustrated in FIG. 8. In this embodiment, vertical parasitic capacitance with the lines of the gate electrode 251 can be eliminated, thereby preventing signal delay.

Alternatively, the upper electrode 267 may be provided as one surface, and the lower electrode 261 may be arranged in plural in one direction.

In one embodiment, the upper electrode 267 and the lower electrode 261 are made of a transparent conductive material having transmission, and thus apply an electric field to the field-emission phosphor layer 265.

The field-emission phosphor layer 265 causes electrons, emitted by the electric field applied between the upper electrode 267 and the lower electrode 261, to be transferred within the field-emission phosphor layer 265 and thus to emit light.

Figure 9:
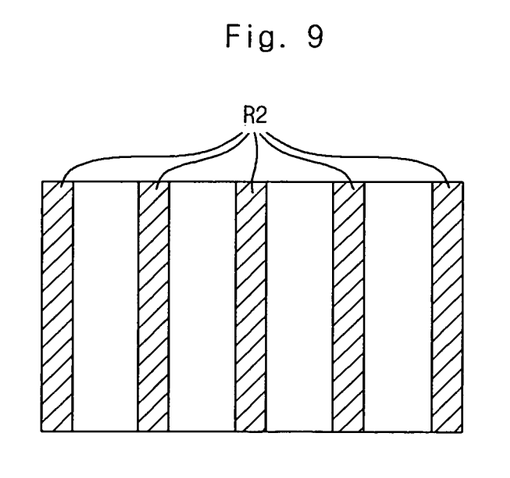
FIG. 9 is a view illustrating the region of light, which is emitted through the light source layer in a LCD.

Accordingly, in the second embodiment, light emitted through the light source layer 260, as illustrated in FIG. 9, has the same shape as that of the upper electrode 267, which is finally transmitted from the light source layer 260. For example, a region R2 of light emitted from the light source layer 260 may be implanted to have the same section as that of the upper electrode 267 arranged in plural in one direction.

According to a second embodiment, any one of the upper electrode 267 and the lower electrode 261 of the light source layer 260 is provided to have a pattern shape, and the region R2 of light emitted through the light source layer 260 is disposed within the pixel region P. Accordingly, light can be effectively emitted within the pixel region P.

In one embodiment, luminance can be partially controlled according to an image, since the pattern shape of the electrodes can be controlled.

In one embodiment, parasitic capacitance can be eliminated and signal delay can be prohibited by forming the pattern structure not to overlap with the lines of the array element 250.

According to a second embodiment, the function and structure of each of the front substrate 210, the rear substrate 220, the color filter layer 230, the liquid crystal layer 240, the array element 250 and the polarization plate 270, and the emission principle of the light source layer 260 are the same as those of the first embodiment, and thus will not be described in order to avoid redundancy.

Third Embodiment

Figure 10:
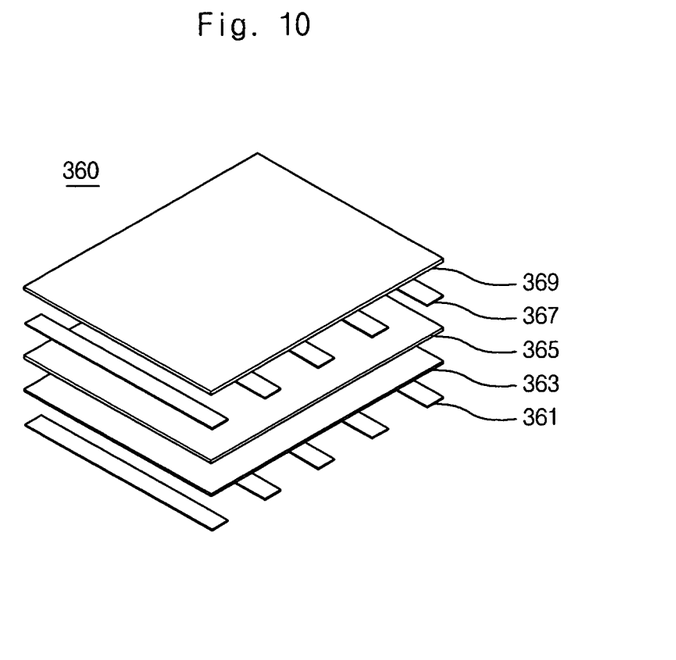
FIG. 10 illustrates one embodiment of a light source layer in a LCD.
Figure 11:
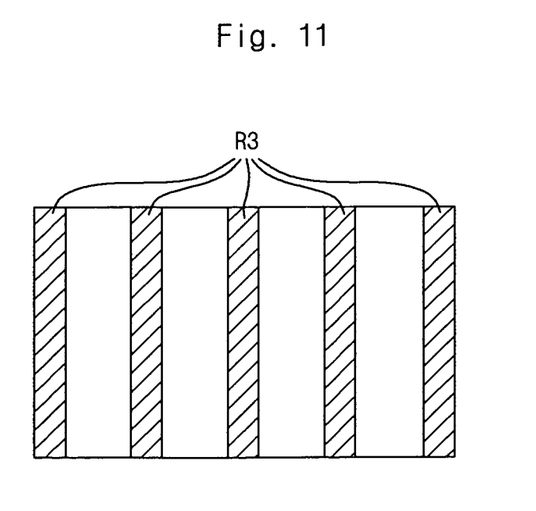
FIG. 11 is a view illustrating a region of light, which is emitted through the light source layer in a LCD.

FIGS. 10 and 11, according to the third embodiment, illustrate another embodiment for eliminating parasitic capacitance with lines of an array element (not shown) and controlling the luminance of light by changing the electrode structure of a light source layer 360, in the same manner as the second embodiment.

The LCD, according to a third embodiment, includes a front substrate and a rear substrate opposite to each other. A color filter layer is disposed below the front substrate. An array element is formed over the rear substrate. A liquid crystal layer is formed between the color filter layer and the array element. A light source layer intervenes between the rear substrate and the array element and is configured to provide light toward the front substrate, and at least one polarization plate laminated on the light source layer.

In one embodiment, the front substrate, the rear substrate, the array element, the color filter layer and the polarization plate have the same function and structure as those of the second embodiment and will not be described in full, but only differences will be described.

For example, in the light source layer, a light source layer 360 of the LCD according to a third embodiment, as illustrated in FIG. 10, includes a lower electrode 361, an upper electrode 367, a field-emission phosphor layer 365 formed between the lower electrode 361 and the upper electrode 367 and made of inorganic white pigments. A lower dielectric layer 363 is formed on the lower electrode 361. An upper dielectric layer 369 is formed on the upper electrode 367.

The upper electrode 367 has a pattern structure in which it is arranged in plural in one direction, and the lower electrode 361 also has a pattern structure in which it is arranged in plural in one direction. The shapes of the upper electrode 367 and the lower electrode 361 may be formed by arranging a plurality of electrodes having the same size in parallel in one direction according to a specific pattern, or may be formed by patterning the electrodes at regular intervals.

The upper electrode 367 and the lower electrode 361 are arranged in a specific pattern, but are arranged not to overlap with the lines of an upper array element (not shown) on an upper side.

For example, in the case where the electrodes are arranged laterally, the upper electrode 367 and the lower electrode 361 are arranged to cross each other without being overlapped with the gate electrode, which is the closest to the array element. Accordingly, vertical parasitic capacitance occurring between the lines of the gate electrode can be prohibited.

In one embodiment, as illustrated in FIG. 10, the upper electrode 367 and the lower electrode 361 are disposed on the same vertical line.

In one embodiment, the upper electrode 367 and the lower electrode 361 are made of a transparent conductive material having transmittance, and apply an electric field to the field-emission phosphor layer 365.

The field-emission phosphor layer 365 causes electrons, emitted by the electric field applied between the upper electrode 367 and the lower electrode 361, to be transferred within the field-emission phosphor layer 365 and thus to emit light.

Accordingly, in the third embodiment, a region R3 of light emitted through the light source layer 360 is formed to have the same shape as that of the upper electrode 367 in which light is finally emitted from the light source layer 360, as illustrated in FIG. 11. For example, the region R3 has the same sectional structure as that of the upper electrode 367 arranged in plural in one direction.

In the LCD, according to a third embodiment, both the upper electrode 367 and the lower electrode 361 of the light source layer 360 have a structure in which they are arranged in a specific pattern. Accordingly, there are advantages in that the upper electrode 367 and the lower electrode 361 can be arranged so that the region of light R3 emitted from the light source layer 360 is emitted within a pixel region P, and the luminance of light can be controlled according to the degree of a pattern. As mentioned above, by including the pattern structure not overlapped with the lines of the array element (not shown), parasitic capacitance can be eliminated and signal delay can be prohibited.

Fourth Embodiment

Figure 12:
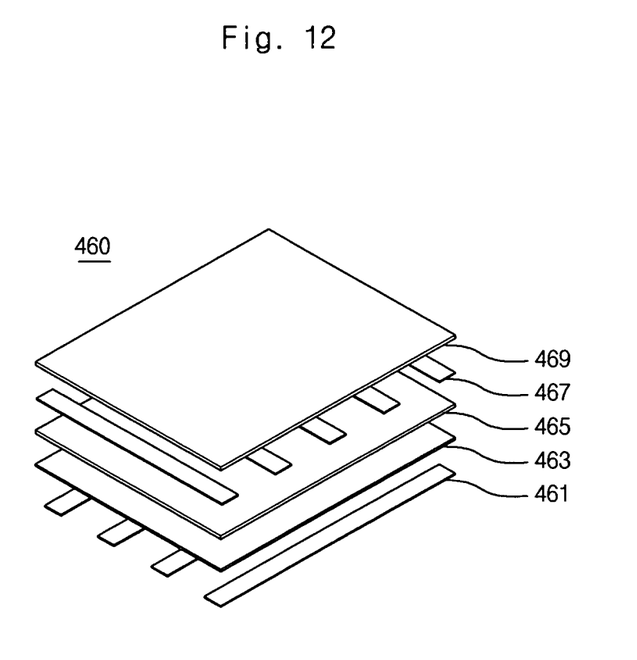
FIG. 12 illustrates one embodiment of a light source layer in a LCD.
Figure 13:
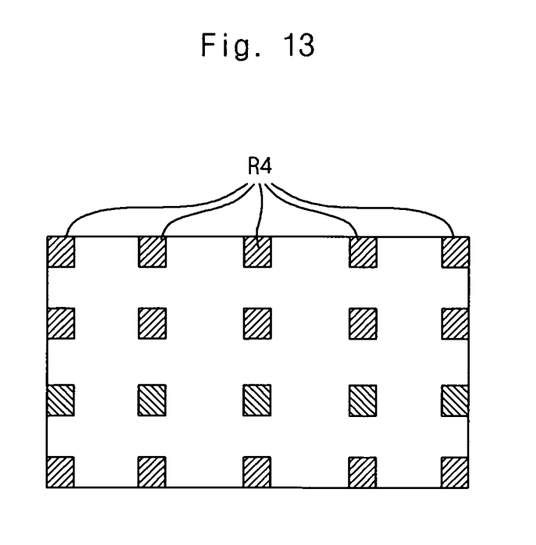
FIG. 13 is a plan view illustrating one arrangement relationship between the light source layer and an array element in the LCD.
Figure 14:
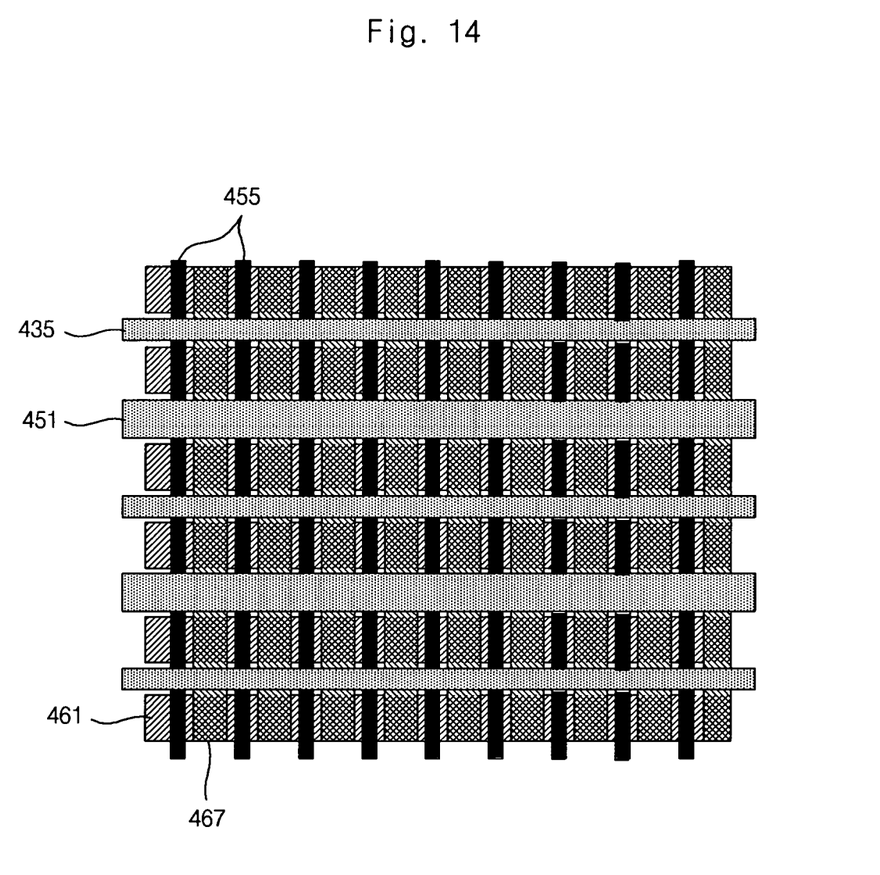
FIG. 14 is a view illustrating the region of light, which is emitted through the light source layer in the LCD.

As shown in FIGS. 12 to 14, a fourth embodiment enables the fabrication of an ultra-thin LCD, eliminating parasitic capacitance with lines of an array element, and controlling the luminance of light by changing the electrode structure of a light source layer, in the same manner as the third embodiment.

A LCD, according to a fourth embodiment, includes a front substrate and a rear substrate opposite to each other. A color filter layer is disposed below the front substrate. An array element is formed over the rear substrate. A liquid crystal layer is formed between the color filter layer and the array element. A light source layer intervenes between the rear substrate and the array element and is configured to provide light toward the front substrate. At least one polarization plate is laminated on the light source layer, in the same manner as the third embodiment.

In one embodiment, the front substrate, the rear substrate, the array element, the color filter layer and the polarization plate have the same function and structure as those of the second embodiment and will not be described in full, rather, only differences will be described.

For example, in the light source layer, a light source layer 460 of the LCD according to a fourth embodiment, as illustrated in FIG. 12, includes a lower electrode 461 and an upper electrode 467. A field-emission phosphor layer 465 is formed between the lower electrode 461 and the upper electrode 467 and is made of inorganic white pigments. A lower dielectric layer 463 is formed on the lower electrode 461, and an upper dielectric layer 469 is formed on the upper electrode 467.

In one embodiment, the upper electrode 467 and the lower electrode 461 are arranged in plural according to a specific pattern in one direction. The arrangement direction of the electrodes may be a longitudinal direction or a traverse direction.

Unlike the structure of the third embodiment, the upper electrode 467 and the lower electrode 461 may be arranged to cross each other, thus forming a lattice form, and be arranged not to overlap with lines of an array element (not shown) on an upper side.

For example, as illustrated in FIG. 13, the upper electrodes 467 (or the lower electrodes), laterally arranged, may be arranged to cross a plurality of the data electrodes 455 so that they are not overlapped with the data electrodes 455, arranged longitudinally, in the array element (not shown). The lower electrodes 461 (or the upper electrodes), arranged longitudinally, may be arranged between the common electrode 435 and the gate electrode 451 so that they are not overlapped with the common electrode 435 and the gate electrode 451, laterally arranged, in the array element (not shown).

The upper electrode 467 and the lower electrode 461 may be formed by arranging a plurality of electrodes having the same size in parallel in one direction, or may be formed by patterning the electrodes at regular intervals, as described above.

In accordance with the fourth embodiment, a region R4 of light emitted through the light source layer 460 corresponds to a region other than regions shielded by the common electrode 435, the gate electrode 451 and the data electrode 455, and also a region in which the upper electrode 467 and the lower electrode 461 are overlapped with each other, as illustrated in FIG. 14.

In one embodiment, in the region R4 of light, the brightness or luminance of light may be set different depending on the degree of each micro pattern that includes the upper electrode 467 and the lower electrode 461. The degree of each micro pattern may be set different depending on an image to be displayed.

In the LCD according to a fourth embodiment, the light source layer 460 having the lattice type electrodes is formed within the cell of the liquid crystal panel including the front substrate, the rear substrate and the liquid crystal layer. Accordingly, an additional backlight unit is not required at the rear of the liquid crystal panel. In this embodiment, parasitic capacitance with the electrodes of the array element can be eliminated through the arrangement structure in which the upper electrodes and the lower electrodes are not overlapped with the lines of the array element.

The electrodes may be partially disposed on the pixel region side so that light can emit, thereby reducing a manufacturing cost and a process time.

A method of manufacturing a LCD according to the present invention will be described in connection with a variety of embodiments with reference to FIGS. 15 and 16.

Figure 15:
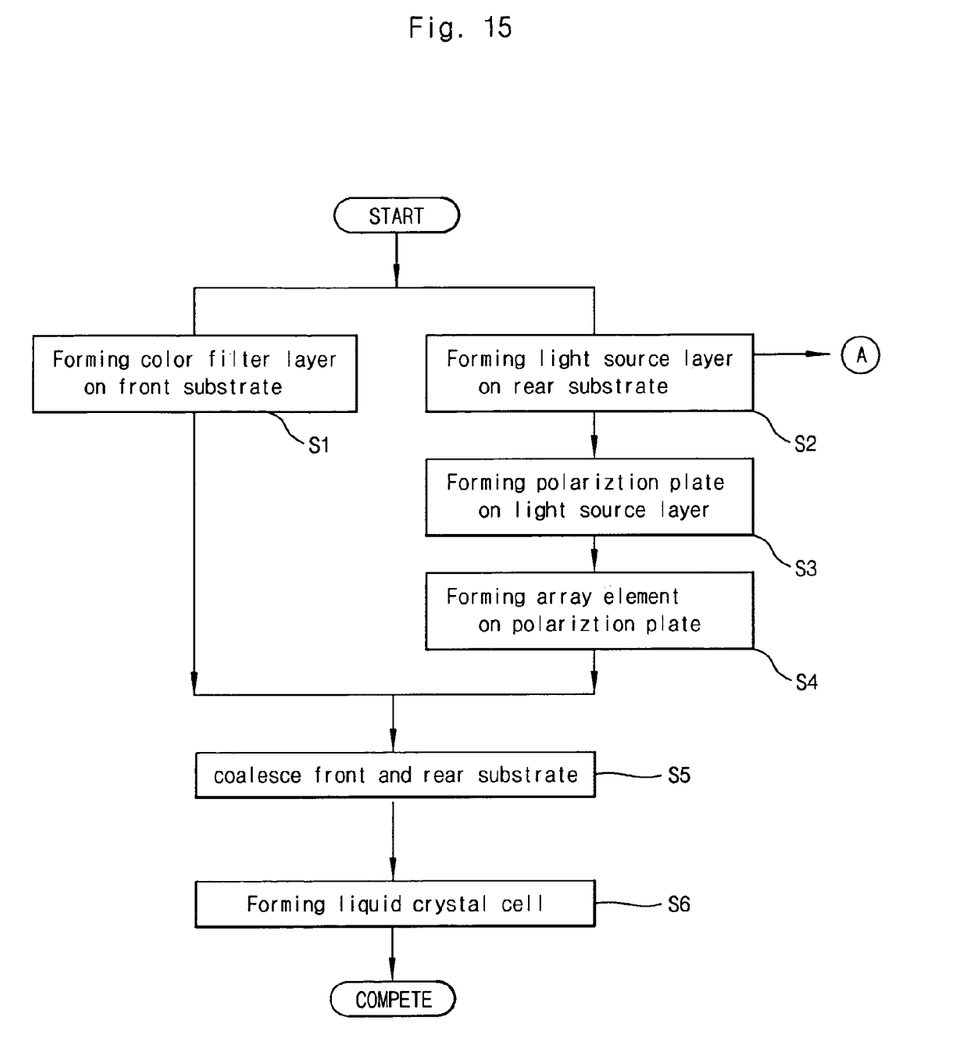
FIG. 15 is a flowchart illustrating a method of manufacturing a liquid crystal display.

FIG. 15 is a flowchart illustrating a method of manufacturing the LCD. FIG. 16 is a detailed flowchart of FIG. 15.

In one embodiment, as illustrated in FIG. 15, a method of manufacturing the LCD having the in-cell backlight includes providing the front substrate and the rear substrate, respectively.

The black matrix and the color filter are formed under the front substrate, thus forming the color filter layer (S1). Forming the color filter layer is well known in the existing method of fabricating the color filter substrate, and thus will not be described in detail.

The light source layer is formed on the rear substrate (S2).

Forming the light source layer includes sequentially forming the lower electrode, the lower dielectric layer, the field-emission phosphor layer, the upper electrode and the upper dielectric layer.

Figure 16:
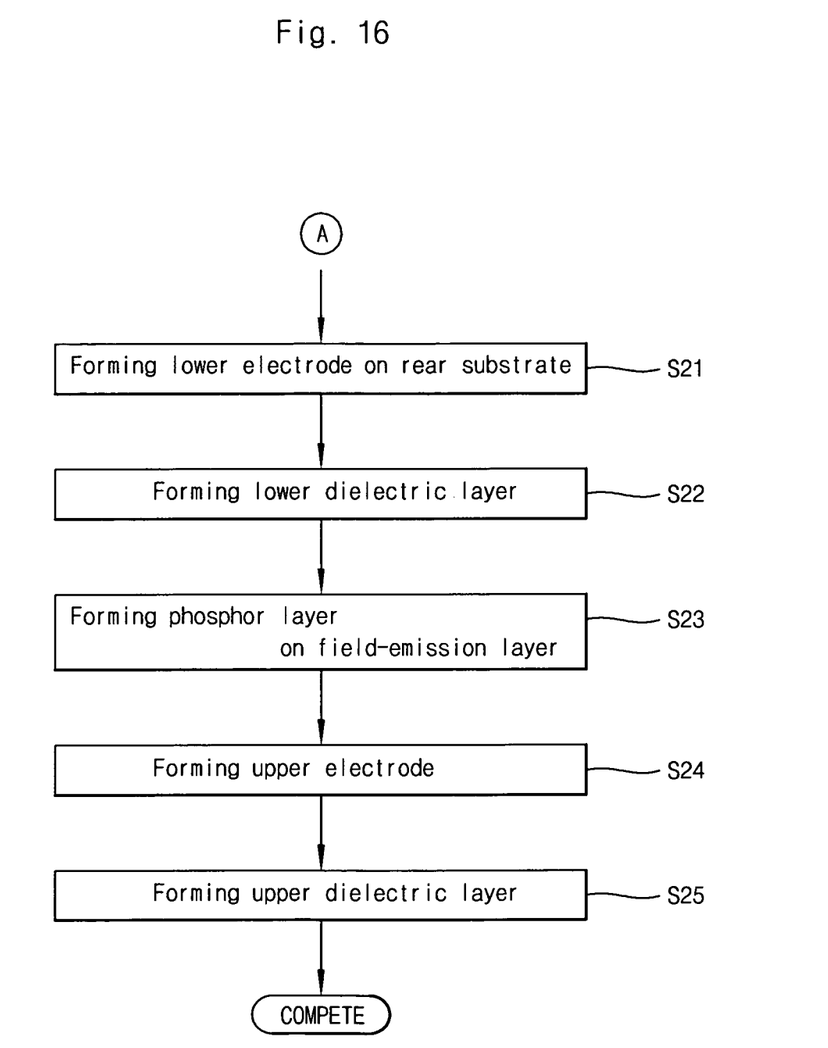
FIG. 16 is a detailed flowchart illustrating a method of manufacturing a liquid crystal display.

For example, as illustrated in FIG. 16, the lower electrode is formed on the rear substrate (S21). The lower electrode may be formed as one surface form having a size that corresponds to the whole area of the light source layer, or may be formed in plural in one direction.

In the case where the lower electrode is formed in plural in one direction, it may be formed by arranging a plurality of lower electrodes having the same size in one direction, or may be formed by selectively patterning the electrodes at regular intervals.

In one embodiment, the lower dielectric layer is formed on the lower electrode (S22).

The field-emission phosphor layer made of inorganic white pigments is formed on the lower dielectric layer (S23). The field-emission phosphor layer collides against electrons generated by an electric field between the lower electrode and the upper electrode, thus generating light.

In one embodiment, the upper electrode is formed on the field-emission phosphor layer (S24).

The upper electrode may also be formed as one surface form having a size corresponding to the whole area of the light source layer, or may be formed in plural in one direction.

In the case where the upper electrode is formed in plural in one direction, it may be formed by arranging a plurality of upper electrodes having the same size in one direction, or may be formed by selectively patterning the electrodes at regular intervals.

In the case where the lower electrode is arranged in plural in one direction, it is preferred that the upper electrodes be arranged in the same direction as that of the structure in which the lower electrodes are arranged, or be arranged orthogonally to the structure in which the plurality of lower electrodes are arranged, thus having a lattice type.

The lower electrodes may be arranged to cross each other without being overlapped with the lines of the array element to be described later.

Parasitic capacitance, which may occur along with the lines of the array element disposed on an upper side, can be eliminated and light generated from the light source layer can emit within the pixel region when the upper electrode or the lower electrode is arranged in plural in one direction, as described above.

In one embodiment, the upper dielectric layer is laminated on the upper electrode, forming the light source layer (S25).

At least one polarization plate is laminated on the light source layer by means of a laminating method at step S3.

The gate electrode, the gate insulating layer, the semiconductor layer, the source and drain electrodes, and the protection layer are sequentially laminated on the polarization plate, thus forming the TFT region. The pixel electrode is then connected to the TFT region, thus forming the array element having the pixel region (S4).

The front substrate and the rear substrate are coalesced with them being spaced apart from each other at specific intervals. A liquid crystal cell is formed between the front substrate and the rear substrate, thus completing the LCD having the in-cell backlight in which the backlight is formed within the cell of the liquid crystal panel (S5 and S6).

In the LCD having the in-cell backlight, the process of assembling the liquid crystal panel and the backlight is not required, unlike an existing manufacturing process of the LCD. Accordingly, the manufacturing process is not complicated, a process time can be shortened, and the manufacturing cost can be saved.

Furthermore, the method of forming the light source layer serving as the backlight unit within the cell of the liquid crystal panel may be applied to not only the liquid crystal panel of the TN mode and the liquid crystal panel of the IPS mode, but also liquid crystal panels of Electrical Controlled Birefringence (ECB), OCB, and VA modes.

Although the present invention has been described in connection with specific embodiments with reference to the accompanying drawings, those skilled in the art will appreciate that the described embodiments may be modified in various different ways or combined with other embodiments, all without departing from the spirit or scope of the present invention.

The foregoing embodiments are merely exemplary and are not to be construed as limiting the claimed subject matter.

The LCD according to the embodiments includes the light source layer for generating light within the cell of the liquid crystal panel. Accordingly, there are advantages in that an additional backlight need not to be installed at the rear of the liquid crystal panel, and ultra-thin lightweight can be maximized accordingly. Furthermore, the luminance of light can be controlled, if appropriate, by changing an electrode pattern structure of the light source layer, and energy can be saved accordingly.

Furthermore, the method of manufacturing the LCD according to specific embodiments does not require the process of assembling the liquid crystal panel and the backlight unlike an existing manufacturing process of a LCD. Accordingly, the manufacturing process is not complicated, a process time can be shortened, and a manufacturing cost can be saved.

What is claimed is:

1. A liquid crystal display having an in-cell backlight, comprising:
    a front substrate and a rear substrate opposite to each other;
    a color filter layer having a black matrix, a color filter and common electrode on the front substrate;
    an array element having a plurality of gate lines and data lines to cross each other, a thin film transistor formed at an area in which the gate lines and data lines cross, and a pixel electrode with the common electrode to generate electric field on the rear substrate;
    a liquid crystal layer disposed between the color filter layer and the array element;
    a polarization plate directly disposed under the array element; and
    a light source layer directly disposed between the rear substrate and the polarization plate and configured to supply light to the front substrate,
    wherein the light source layer comprises:
    a lower electrode and an upper electrode;
    a field-emission phosphor layer disposed between the lower electrode and the upper electrode and configured to emit light;
    a lower dielectric layer disposed on the lower electrode; and
    an upper dielectric layer disposed on the upper electrode,
    wherein the lower electrode is provided as one surface electrode, and the upper electrode includes a plurality of strip electrodes arranged in one direction, the lower electrode and the upper electrode having two different shapes such that the one surface electrode of the lower electrode substantially overlaps with the plurality of strip electrodes of the upper electrode,
    wherein the upper electrode is arranged in parallel with the gate lines but the upper electrode is arranged without being overlapped with the gate lines,
    wherein carriers, which are discharged by an electric field applied between the lower electrode and the upper electrode, are electronically transferred within the field-emission phosphor layer and emit light, and
    wherein the size of the lower electrode corresponds to a whole area of the light source layer.

2. The liquid crystal display as claimed in claim 1, wherein the field-emission phosphor layer comprises inorganic white pigments.

3. The liquid crystal display as claimed in claim 1, wherein the upper electrode is arranged longitudinally or laterally, along the plurality of gate and data lines.

* * * * *